(12) United States Patent
Brooks et al.

(10) Patent No.: US 8,806,255 B2
(45) Date of Patent: Aug. 12, 2014

(54) INTERFACE CONNECTION CONTROL BASED ON VOLTAGE AT INPUT RAIL

(75) Inventors: Robert C Brooks, Houston, TX (US);
Robert S Wright, Spring, TX (US);
Nam Nguyen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 283 days.

(21) Appl. No.: 13/222,736

(22) Filed: Aug. 31, 2011

(65) Prior Publication Data
US 2013/0055002 A1    Feb. 28, 2013

(51) Int. Cl.
*G06F 11/30* (2006.01)
(52) U.S. Cl.
USPC .......................... 713/340; 713/300; 713/310
(58) Field of Classification Search
USPC .......................................... 713/300, 310, 340
See application file for complete search history.

(56) References Cited

U.S. PATENT DOCUMENTS

| 7,124,307 | B2 * | 10/2006 | Sugita et al. | 713/300 |
| 7,586,345 | B2 | 9/2009 | Kim | |
| 7,689,841 | B2 | 3/2010 | Lee | |
| 2003/0107566 | A1 * | 6/2003 | Shin et al. | 345/212 |
| 2004/0246636 | A1 * | 12/2004 | Inoue et al. | 361/18 |
| 2005/0052797 | A1 * | 3/2005 | Yan | 361/18 |
| 2006/0245133 | A1 * | 11/2006 | Cetrulo et al. | 361/91.1 |
| 2007/0088964 | A1 * | 4/2007 | Lee | 713/300 |
| 2007/0222415 | A1 * | 9/2007 | Shah et al. | 320/107 |
| 2007/0273346 | A1 * | 11/2007 | Lin et al. | 323/276 |
| 2009/0167274 | A1 * | 7/2009 | Chien et al. | 323/285 |
| 2010/0073837 | A1 | 3/2010 | Predtetchenski et al. | |
| 2010/0169513 | A1 * | 7/2010 | Levin | 710/18 |
| 2010/0191984 | A1 | 7/2010 | Ghosh et al. | |
| 2011/0018344 | A1 * | 1/2011 | Liao et al. | 307/31 |

FOREIGN PATENT DOCUMENTS

CN         2874511         2/2007

OTHER PUBLICATIONS

Resettable Fuses for Overcurrent Protection; Research Paper 2009, Bourns, Inc.

* cited by examiner

*Primary Examiner* — Vincent Tran
(74) *Attorney, Agent, or Firm* — Neel Patel

(57) ABSTRACT

Embodiments herein relate to controlling a connection to an interface. In an embodiment, a protection circuit is to detect a voltage at an input rail of a regulator, where the regulator is to provide power to a peripheral device via an interface. Next, the protection circuit is to compare the detected voltage to a reference voltage. Then, the protection circuit is to generate a detection signal based on the comparison. Lastly, the protection circuit is to disable a connection between the regulator and the interface based on the detection signal.

14 Claims, 5 Drawing Sheets

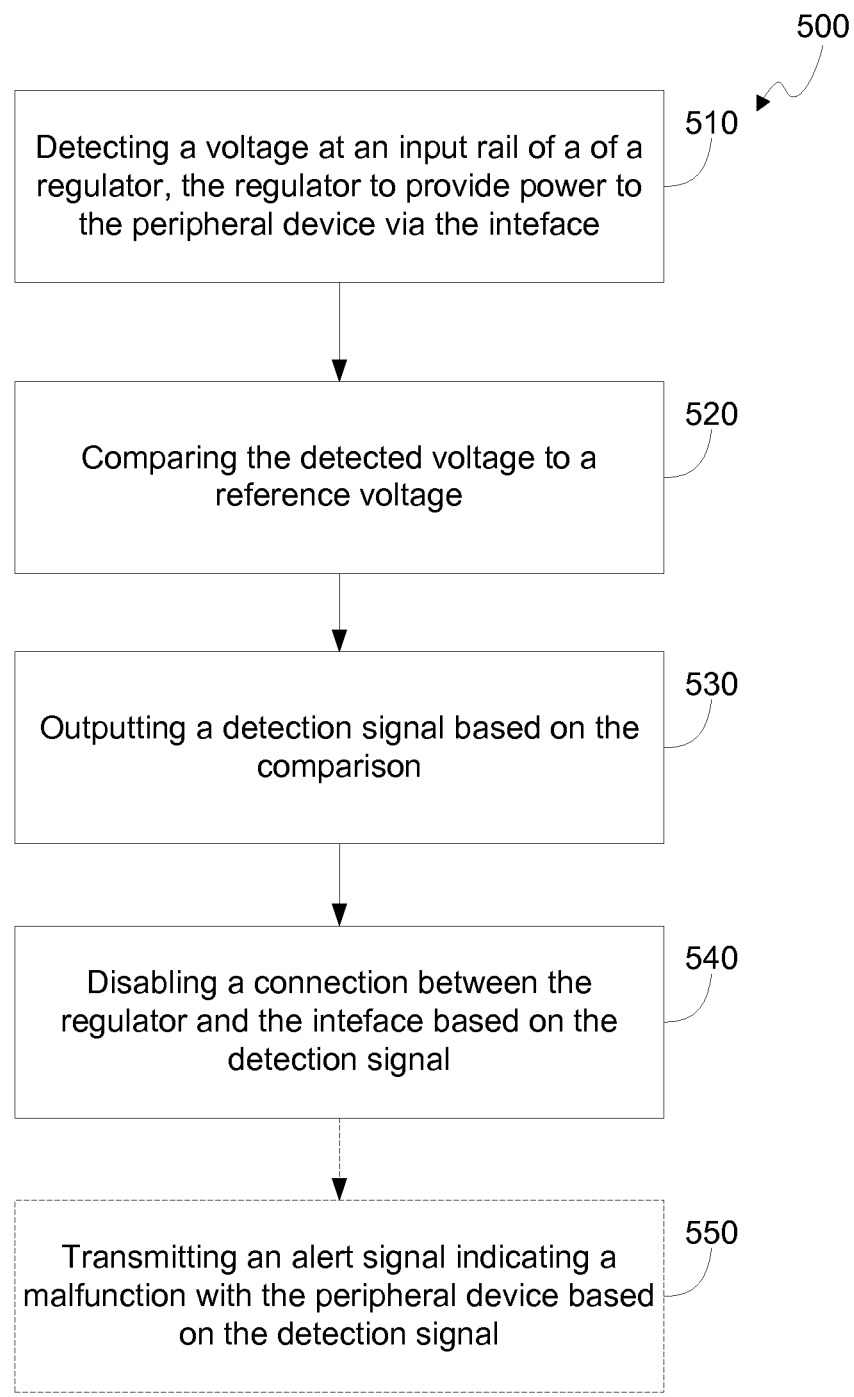

INTERFACE CONNECTION CONTROL BASED ON VOLTAGE AT INPUT RAIL

BACKGROUND

Peripheral devices may interface with a main device, such as a computing device. However, the peripheral device may damage the main device if the peripheral device malfunctions or has a flawed design.

BRIEF DESCRIPTION OF THE DRAWINGS

The following detailed description references the drawings, wherein:

FIG. 5 is a flowchart of an example method for controlling a connection to an interface.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Peripheral devices may interface or connect with a main device or system, such as a computing device. However, some peripheral devices may have a capability to damage the main device or system if the peripheral device malfunctions or has a flawed design. For example, the peripheral device, such as a self-powered Universal Serial Bus (USB) device, may leak power to the main device or system, such as a computing device. If a voltage at a first terminal of the peripheral device, such as an upstream USB port of a self-powered Universal Serial Bus (USB) device, is greater than a voltage at a second terminal of the main device or system, such as a USB port of the computing device, that connects to the first terminal, a current may be driven from the peripheral device to one or more components, such as a motherboard, of the main device or system.

For example, an input voltage rail of a regulator of the main device or system may become charged by the current driven from the peripheral device to the main device or system. The input voltage rail may power one or more components of the main device or system. Thus, if the voltage rail is charged to a voltage that is greater than a maximum voltage rating of the one or more components of the main device or system, the one or more components of the main device or system may become damaged.

Embodiments provide a generally low cost and reliable method and/or device to disable a connection between the peripheral device and the regulator if the peripheral device erroneously charges the input rail of the regulator beyond a safe voltage level. For example, embodiments may include a detection circuit to detect a voltage level at the input rail of the regulator and a disabling circuit to disable the connection between the regulator and an interface that connects to the peripheral device. Further, embodiments may include an alert unit to signal to a user and/or other component of the main device or system that the peripheral device is malfunctioning or has a design flaw. As a result, damage or a likelihood of damage to the main device or system may be reduced or prevented if the peripheral device malfunctions or has a design flaw.

Figure 1:
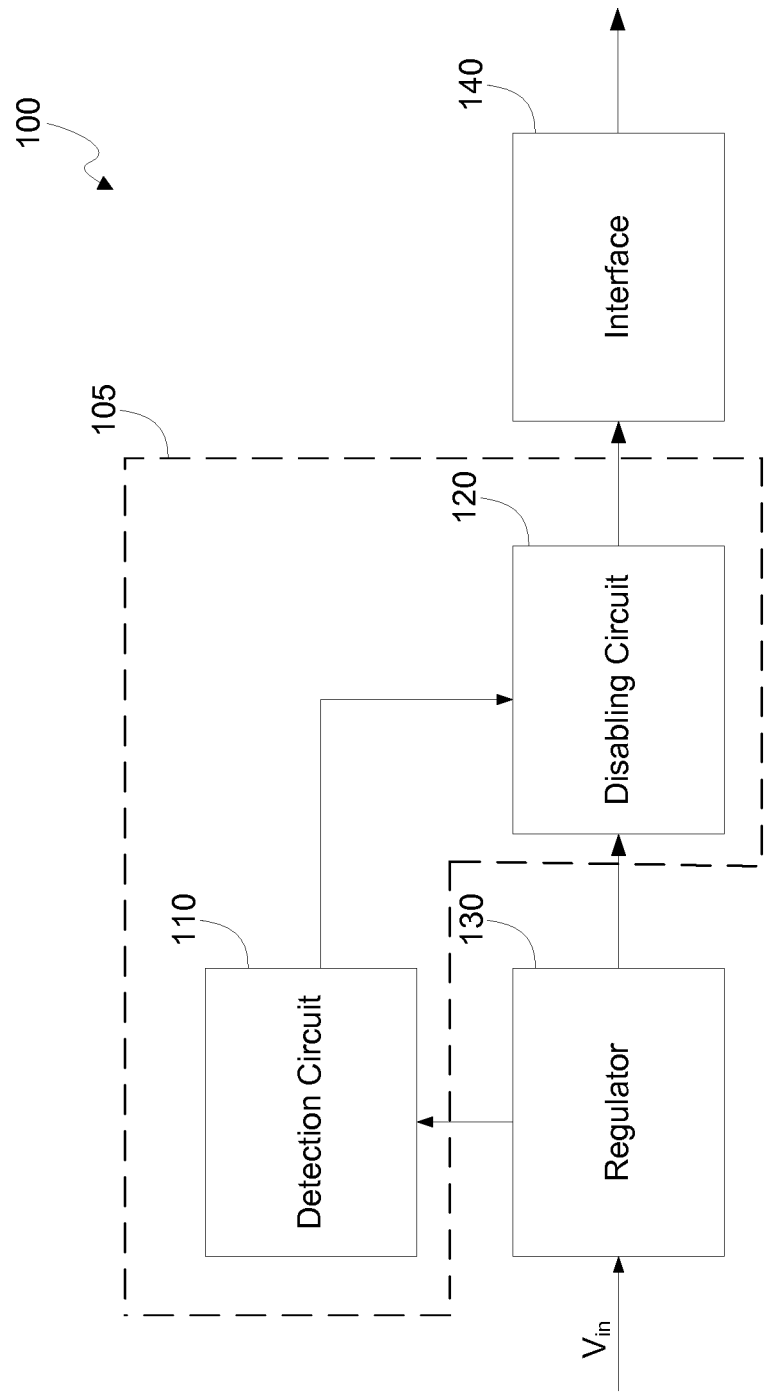
FIG. 1 is a diagram of a power system including an example protection circuit.

FIG. 1 is a diagram of a power system 100 including an example protection circuit 105. The power system 100 may connect to or part of a larger system, such as a printed circuit assembly (PCA), included in a main device (not shown). Examples of the main device may include a notebook computer, a desktop computer, an all-in-one system, a slate computing device, a portable reading device, a wireless email device, a mobile phone, and the like.

In the embodiment of FIG. 1, the protection circuit 105 includes a detection circuit 110 and a disabling circuit 120. The system 100 further includes a regulator 130 and an interface 140. The power system 100 may interface with a peripheral device (not shown) via the interface 140. Examples of the peripheral device may include computer peripherals such as keyboards, pointing devices, digital cameras, printers, portable media players, disk drives, network adapters, and the like.

The main and peripheral devices may connect to each other via a standard protocol and/or connection, such as a Universal Serial Bus (USB) connection. The peripheral device may be external or internal to the main device. Further, the peripheral device may receive power from the main device or from a separate external source. For example, the peripheral device may be a self-powered hub that connects to the main device but also receives power from a wall outlet.

The regulator 130 is to provide power to the peripheral device via the interface 140. For instance, the regulator 130 may receive an input voltage $V_{in}$ at a first voltage level, such as 12 or 19 volts (V), and output an output voltage at a second voltage level, such as 5 V. The regulator 130 may supply the output voltage to the interface 140 to power the peripheral device, if the peripheral device requires power from the power system 100 to operate, such as a bus-powered peripheral device. An example of the regulator 130 will be shown in greater detail with respect to FIG. 2.

The interface 140 is to transmit and/or receive data and/or power between the main device and the peripheral device. For example, the interface 140 may transmit power from the regulator 130 to the peripheral device. The interface 140 may include mechanical and/or electrical components along with any logical signals and/or protocols required to connect and/or communicate with the peripheral device.

The detection circuit 110 is to detect a voltage at an input rail (not shown) of the regulator 130. The voltage at the input rail of the regulator 130 increases if a voltage at a first terminal (not shown) of the peripheral device exceeds a voltage at a second terminal (not shown) of the interface 140 that connects to the first terminal. The input rail may define a point or connection along which the input voltage $V_{in}$ is received. Further, the detection circuit 110 is to compare the detected voltage to a reference voltage, and to output a detection signal based on the comparison. In an embodiment, the detected voltage may represent a fraction of the actual voltage at the input rail. For example, a voltage divider may be included in the detection circuit 110 to reduce a value of the detected voltage compared to the actual voltage at the input rail.

The reference voltage may signify a voltage value that when met or exceeded, causes damage to the main device. The reference voltage may vary for different types of systems and may be determined experimentally and/or set according to a user's or manufacturer's suggestion. For example, systems having different motherboards may have different voltage tolerances. In addition, a value of the reference voltage may vary according to an amount the detected voltage is reduced compared to the actual voltage at the input rail. An example of the detection circuit 110 will be shown in greater detail with respect to FIG. 3.

The disabling circuit 120 is to disable a connection between the regulator 130 and the interface 140 based on the detection signal. For example, the disabling circuit 120 may include a switch to selectively open based on the detection signal. Examples of the disabling circuit 120 will be shown in greater detail with respect to FIGS. 4A and 4B.

Figure 2:
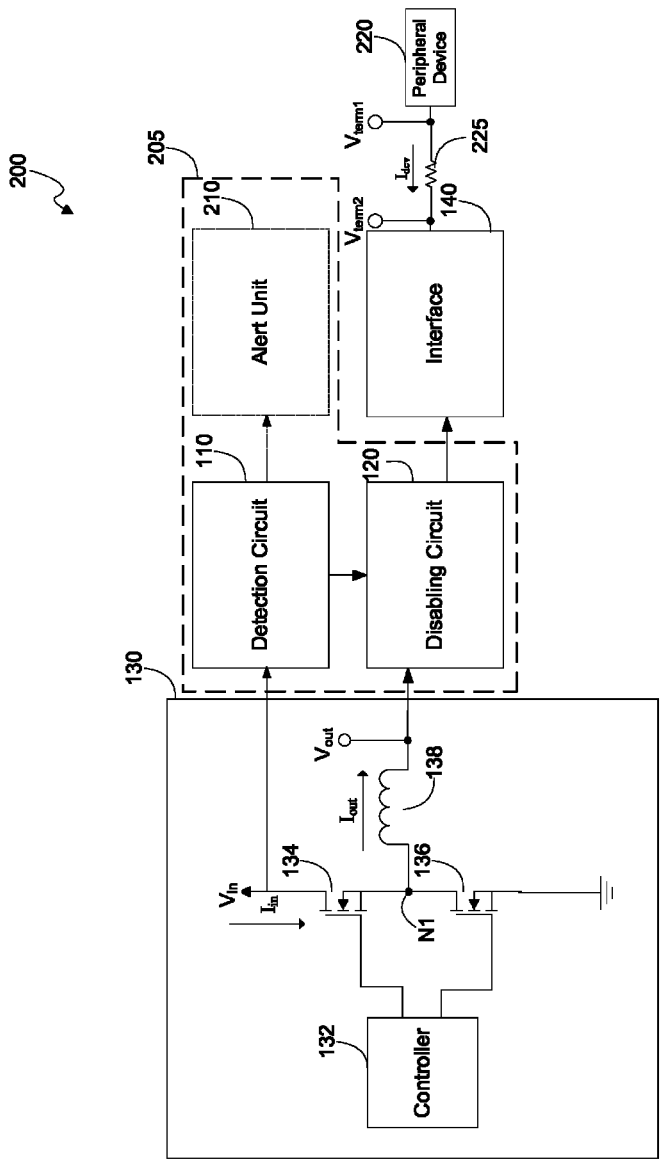
FIG. 2 is another diagram of a power system including an example protection circuit.

FIG. 2 is another diagram of a power system 200 including an example protection device 205. In this embodiment, similar to FIG. 1, the power system 200 includes the regulator 130 and the interface 140. However, the protection circuit 205 optionally includes an alert unit 210, in addition to the detection circuit 110 and the disabling circuit 130. Further, a peripheral device 220 is shown to connect to the interface 140, where a connection resistor 225 is shown to represent a resistance of the connection between peripheral device 220 and the interface 140.

The regulator 130 may include a controller 132, a first transistor 134, a second transistor 136 and an inductor 138. The regulator 130 may be, for example, a switching regulator, such as a synchronous buck regulator. For example, the controller 132 is to control a gate of each of the first and second transistors 134 and 136. A first terminal of the first transistor 134 connects to the input rail to receive the input voltage $V_{in}$ and a second terminal of the first transistor 134 connects to a first node N1. In one embodiment, a first terminal of the second transistor 136 and a first end of the inductor 138 also connect to the first node N1. A second terminal of the second transistor 136 connects to a ground. A second end of the inductor 128 outputs the voltage $V_{out}$ at an output rail (not shown) to the interface 140 via the disabling circuit 120. As shown in FIG. 2, the detection circuit 110 connects to the input rail to detect the voltage at the input rail.

In operation, the controller 132 may turn on the first transistor 134 and turn off the second transistor 136 for a brief period of time, such as 100 nanoseconds, for every cycle, such as 3 microseconds. During this time, an input current $I_{in}$ may flow from the input voltage rail and through the inductor 138, as shown by an output current $I_{out}$, to charge the output rail of the regulator 130. The controller 132 may turn off the first transistor 134 and turn on the second transistor 136 for the remainder of the cycle. While the first and second transistors 134 and 136 are shown to be N-channel metal-oxide-semiconductor field-effect transistors (MOSFET), the regulator 130 may include other types of transistors as well.

As noted above, the system 200 and the peripheral device 220 may be powered by separate power sources. For example, the peripheral device 220 may connect to the interface 140 via a USB connection, where the first terminal is to receive power and the second terminal is to transmit power. The peripheral device 220 may connect to the interface 140 via other types of connections as well, such as ESATA, HDMI, etc. However, if the peripheral device 220 is misbehaving by leaking power, a first terminal voltage $V_{term1}$ at the first terminal of the peripheral device 220 may exceed a second terminal voltage $V_{term2}$ at the second terminal of the interface 140. Such a case may exist when the peripheral device 200 is detected by the system 200 to be a self-powered device, such as a self-powered USB hub. Therefore, the system 200 may not transmit any power to the peripheral device 220. However, the peripheral device 220 may have a design flaw or malfunction that causes it to leak power to the system 200. In one embodiment, the peripheral device can leak power if there is a direct short between an adapter pin and a power pin of an upstream USB port of peripheral device 220.

Thus, if the first terminal voltage $V_{term1}$ is greater than the second terminal voltage, $V_{term2}$, then a device current $I_{dev}$ will flow from the peripheral device 220 to the regulator 130 through the interface 140. Further, a voltage drop may occur across the connection between the first and second terminals, where the resistance of the connection resistor 225 is very low. Thus, the device current, $I_{dev}$ may be relatively high.

The device current $I_{dev}$ from the peripheral device 220 may flow into the interface 140, through the disabling circuit 120 and through the inductor 138 of the regulator 130. Thus, if the device current $I_{dev}$ is high enough, the output current $I_{out}$ through the inductor 138 will be negative. Consequently, instead of current flowing from the input rail to the output rail when the first transistor 134 is on, current will flow from the output rail to the input rail. As a result, the input rail of the regulator 130 will be charged. If the input rail is charged to a high voltage, such as above 25 V, the system 200 or a component connecting to the system 200, such as other integrated circuits (IC) of the PCA, may be damaged. As explained above, a maximum voltage rating of component receiving power from the input rail may determine whether the component is damaged.

As shown in FIG. 2, the alert unit 210 is to output an alert signal to indicate a malfunction and/or design flaw of the peripheral device 220 based on the detection signal. Thus, the alert signal may be used to notify, for example, a user or administrator, of an issue with the peripheral device 220. For example, the alert unit 210 may output the alert signal to an external component, such as a southbridge of a computing device or USB_OC# pin of a motherboard, when the detection signal is asserted. Examples of the alert unit 220 will be shown in greater detail with respect to FIGS. 4A and 4B.

Figure 3:
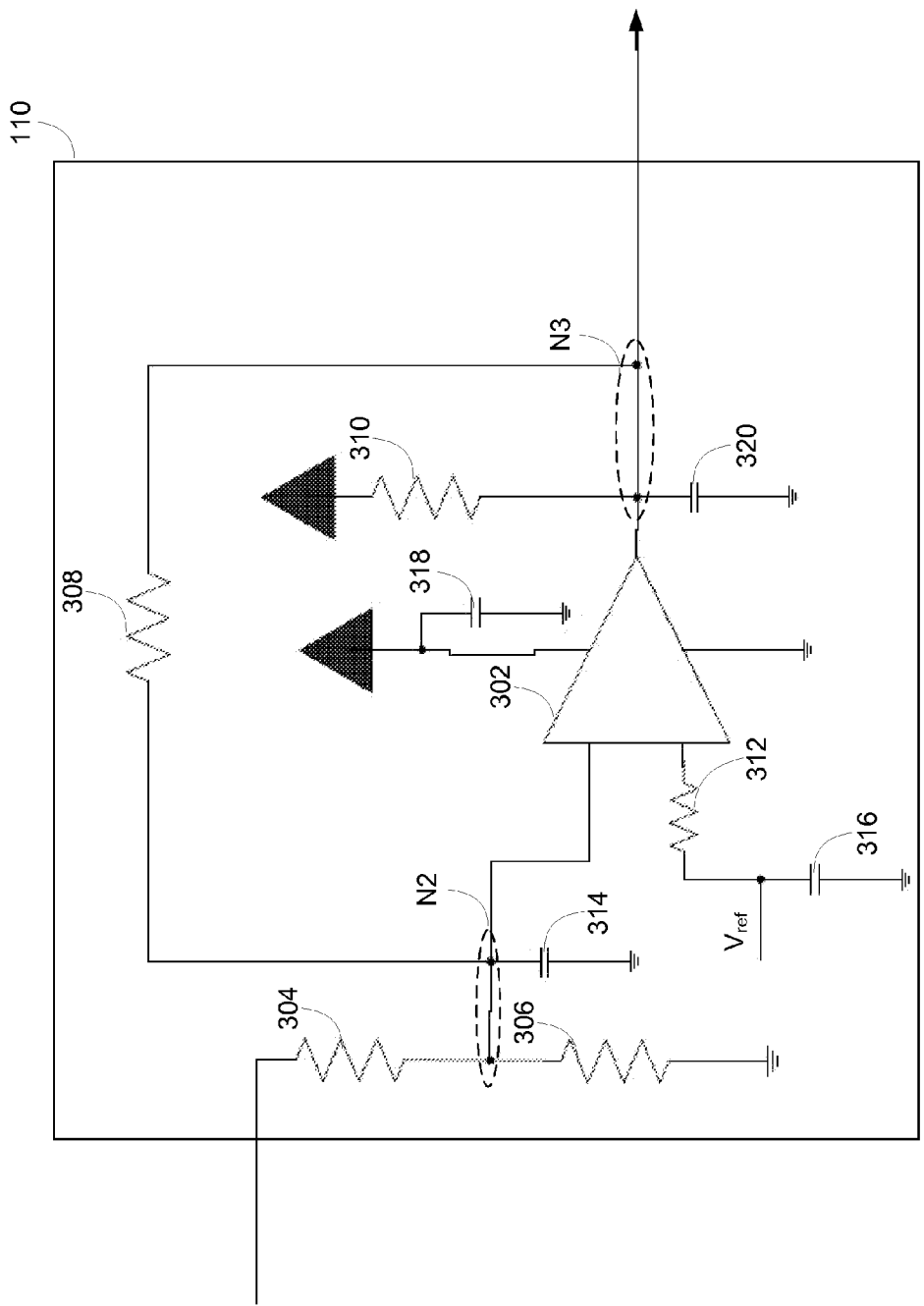
FIG. 3 is an example diagram of the detection circuit of FIGS. 1 and 2.

FIG. 3 is an example diagram of the detection circuit 110 of FIGS. 1 and 2. In the embodiment of FIG. 3, the detection circuit 110 includes a comparator 302, a first resistor 304, a second resistor 306, a third resistor 308, a fourth resistor 310 and a fifth resistor 312. The system 200 further includes a first capacitor 314, a second capacitor 316, a third capacitor 318 and a fourth capacitor 320. The first through fourth capacitors 314, 316, 318 and 320 may act as filter capacitors. Further, the fourth resistor 310 may act as a pull-up resistor. In other embodiments, other combinations of resistors, capacitors, and/or other components may be used.

A first end of the first resistor 304 is connected to the input rail of the regulator 130 and a second end of the first resistor 304 is connected to a second node N2. A first end of the second resistor 306 is connected to the second node N2 and a second end of the second resistor 306 is connected to the ground. A first terminal of the comparator 302 is connected to the second node N2. Thus, the first and second resistors 304 and 306 act as a voltage divider and the detected voltage at the first terminal of the comparator 320 is reduced proportionally compared to an actual voltage at the input rail of the regulator 130. However, embodiments may also exclude the voltage divider formed by the first and second resistors 304 and 306. Further, a resistance of the resistors 304 and 306 may be determined experimentally and/or according to a user's or manufacturer's specification.

A second terminal of the comparator 302 is connected to a first end of the fifth resistor 312. A second end of the fifth resistor 312 is connected to a first end of the second capacitor 316. A second end of the second capacitor 316 connects to the ground. A reference voltage is received at the second terminal via a connection between the second capacitor 316 and the fifth resistor 312. The fifth resistor 312 may limit a current to the comparator 302. As noted above, the reference voltage indicates a voltage that when met or exceeded, may cause damage to the main device. Further, a value of the reference voltage may be adjusted according an amount the detected voltage is reduced by the voltage divider formed by the first and second resistors 304 and 306.

The comparator 302 is to compare the reference voltage at the second terminal to the detected voltage at the first terminal. If the detected voltage is greater than the reference voltage, the comparator 302 is to assert the detection signal or to output the detection signal at a high logic level. Otherwise, the comparator 302 is to set the detection signal to a low logic level. However, embodiments of the comparator 302 may also instead output the detection signal at the low logic level if the detected voltage is greater than the reference voltage and otherwise output the detection signal at the high logic level.

A third terminal of the comparator 302 is connected to a source voltage and a first end of the third capacitor 318 in parallel. A second end of the third capacitor 318 is connected to the ground. A fourth terminal of the comparator 302 is connected to the ground. The third and fourth terminals may relate to driving an output, the detection signal, of the comparator 302.

A first end of the fourth resistor 310 is connected to the source voltage and a second end of the fifth resistor 310 is connected to third node N3 that connects to the output of the comparator 302. A first end of the fourth capacitor 320 is also connected to the third node N3 and a second end of the fourth capacitor 320 is connected to the ground. The fourth resistor 310 and the fourth capacitor 320 may act as an open collector for the output of the comparator 302. The third resistor 308 is connected in series between the second node N2 and the third node N3. The first capacitor 314 is connected between the second node N2 and the ground. The third resistor 308 together with the first capacitor 314 may add hysteresis to the detection circuit 110 to prevent or reduce unwanted rapid switching of the output of the comparator 302.

Figure 4A:
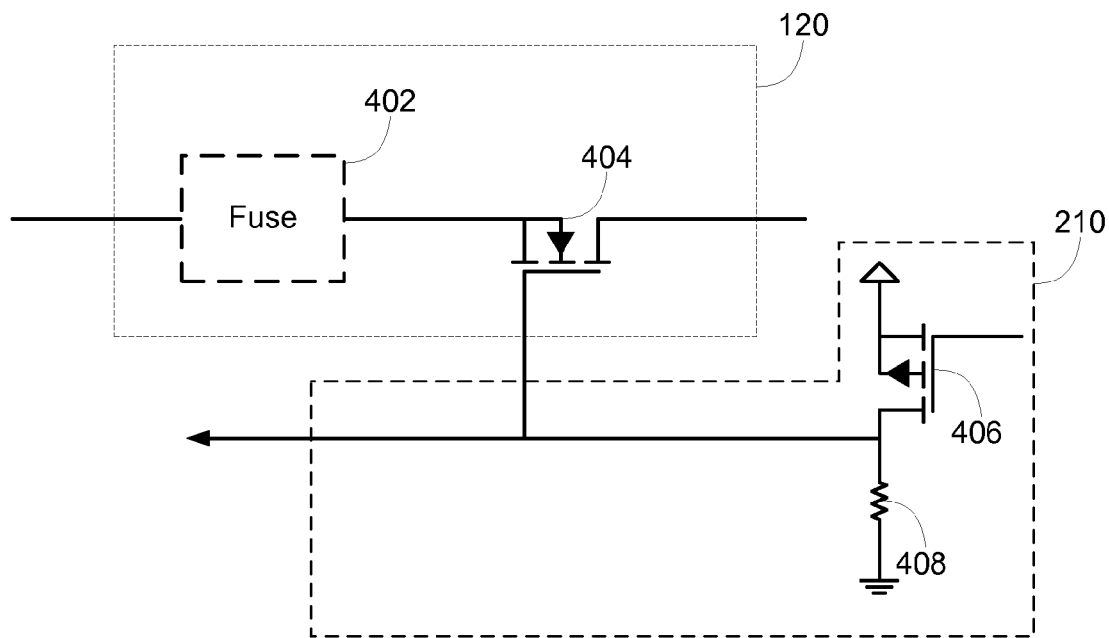
FIG. 4A is an example diagram of the disabling circuit and the alert unit of FIG. 2.

FIG. 4A is an example diagram of the disabling circuit 120 and the alert unit 210 of FIG. 2. In this embodiment, the disabling circuit 120 includes a third transistor 404 and optionally, a fuse 402. The alert unit 210 includes a fourth transistor 406 and a sixth resistor 408. A first end of the fuse 402 is connected to the output rail of the regulator 130 and a second end of the fuse 402 is connected to a first terminal of the third transistor 404. A second terminal of the third transistor 404 is connected to the interface 140. The fuse 402 is to protect against overcurrent faults by opening when a current across the fuse 402 exceeds a fuse current threshold. The fuse current threshold may define a current value that, if exceeded, may damage one or more components of the system 200. Examples of the fuse 402 may also include a non-resettable fuse, resettable fuse, a semiconductor fuse, and the like.

A first terminal of the fourth transistor 406 of the alert unit 210 is connected to a source voltage. A second terminal of the fourth transistor 406 is connected to a first end of the sixth resistor 408 of the alert unit 210 and is output from the alert unit 210 as the alert signal. The alert signal is also connected to a gate of the third transistor 404 of the disabling circuit 120. A second end of the sixth resistor 408 is connected to the ground. A gate of the fourth transistor 406 is connected to the detection signal of the detection circuit 110.

In this embodiment, the third transistor 404 of the disabling circuit 120 is shown to be an N-channel MOSFET and the fourth transistor 406 of the alert unit 210 is shown to a P-channel MOSFET. However, embodiments may include other types of transistors or switch type components as well.

Thus, in operation, when the detection signal is at the low logic level, the alert signal is at a high logic level. As a result, the third transistor 404 of the disabling circuit 120 connects the regulator 130 to the interface 140. However, when the detection signal is at the high logic level, the alert signal is at a low logic level. As a result, the third transistor 404 of the disabling circuit 120 disconnects the regulator 130 from the interface 140.

In this embodiment, the disabling circuit 110 and the alert unit 210 share components, such as the fourth transistor 406. Thus, the disabling circuit 110 and the alert unit 210 may form a single unit, which uses fewer components than if the disabling circuit 110 and the alert unit 210 were separate units.

Figure 4B:
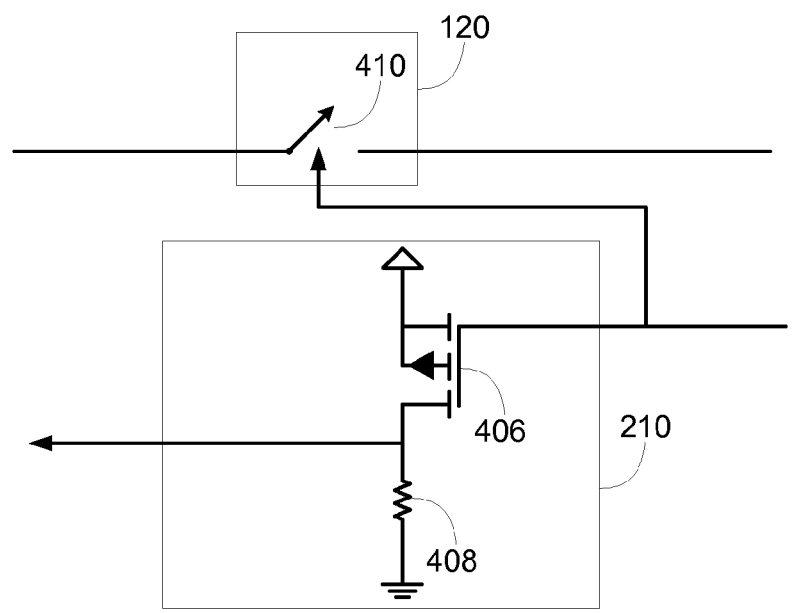
FIG. 4B is another example diagram of the disabling circuit and the alert unit of FIG. 2.

FIG. 4B is another example diagram of the disabling circuit 120 and the alert unit 210 of FIG. 2. In this embodiment, the disabling circuit 120 includes a switch 410. The alert unit 210 of FIG. 4B may be similar to the alert unit 210 of FIG. 4A, except the alert signal is not further output to the disabling circuit 120. Instead, the detection signal from the detection circuit 110 is output to the disabling circuit 120, as well as the alert unit 210. The switch 410 of the disabling circuit 120 is to toggle between an open and closed stated based on the detection signal.

For example, the switch 410 may be an electrical and/or electromechanical component with a set of electrical contacts, where the contacts are touching during the closed state and separated during the open state. In this embodiment, the switch 410 is to toggle to the closed state when the detection signal is at the low logic level and is to toggle to the open state when the detection signal is at the high logic level. Thus, in operation, the disabling circuit 120 connects the regulator 130 to the interface 140 when detection signal is at the low logic level and disconnects the regulator 130 from the interface 140 when detection signal is at the high logic level. Unlike the embodiment of FIG. 4A, the disabling circuit 120 and the alert unit 210 of FIG. 4B do not share components and are therefore separable. Hence, the disabling circuit 120 may function regardless of whether the alert unit 210 is included in the protection circuit 205.

FIG. 5 is a flowchart of an example method 500 for controlling a connection to the interface 140. Although execution of the method 500 is described below with reference to the power system 200 of FIG. 2, other suitable devices for execution of the method 500 will be apparent to those of skill in the art, such as the power system 100 of FIG. 1. In the embodiment of FIG. 5, at block 510, the detection circuit 110 detects a voltage at an input rail of the regulator 130, the regulator 130 is to provide power to the peripheral device 220 via the interface 140. Then, at block 520, the detection circuit 110 compares the detected voltage to the reference voltage. Next, at block 530, the detection circuit 110 outputs the detection signal based on the comparison. For example, the detection circuit 110 asserts the detection signal if the detected voltage is greater than the reference voltage.

Next, at block 540, the disabling circuit 120 disables a connection between the regulator 130 and the interface 140 based on the detection signal. For example, the disabling circuit 120 may toggle a switch or drive a gate of a transistor to disable the connection between the regulator 130 and the interface 140. Optionally, at block 550, the alert unit 210 transmits the alert signal indicating a malfunction with the peripheral device 220 based on the detection signal.

In this embodiment, the interface 140 receives a device current $I_{dev}$ from the peripheral device 220 if a voltage at the first voltage terminal $V_{term1}$ of the peripheral device 220 exceeds a voltage at the second voltage terminal $V_{term2}$ of the interface 140. The device current $I_{dev}$ from the peripheral device 220 is received at the input rail of the regulator 130 if the device current $I_{dev}$ from the peripheral device 220 exceeds the output current $I_{out}$ output by the regulator 130. Further, the input rail is charged if the device current $I_{dev}$ from the peripheral device 220 is received at the input rail.

According to the foregoing, embodiments provide a generally low cost and reliable method and/or device to disable a connection between the peripheral device and the regulator if the peripheral device erroneously charges the input rail of the regulator beyond a safe voltage level. For example, the protection circuit may include a detection circuit to detect a voltage level at the input rail of the regulator and a disabling circuit to disable the connection between the regulator and an interface that connects to the peripheral device.

What is claimed is:

1. A method for controlling a connection to an interface using a protection circuit, comprising:
   detecting a voltage at an input rail of a regulator, the regulator to provide power to a peripheral device via the interface;
   comparing the detected voltage to a reference voltage;
   outputting a detection signal based on the comparison; and
   disabling a connection between the regulator and the interface based on the detection signal, wherein
   the interface receives a current from the peripheral device if a voltage at a first terminal of the peripheral device exceeds a voltage at a second terminal of the interface.

2. The method of claim 1, further comprising:
   transmitting an alert signal indicating a malfunction with the peripheral device based on the detection signal.

3. The method of claim 1, wherein disabling the connection between the regulator and the interface includes at least one of toggling a switch and driving a gate of a transistor.

4. The method of claim 1, wherein,
   the current from the peripheral device is received at the input rail if the current from the peripheral device exceeds a current output by the regulator, and
   the input rail is charged if the current from the peripheral device is received at the input rail.

5. A protection device, comprising:
   a detection circuit,
      to detect a first voltage at an input rail of a regulator to provide power to a peripheral device via an interface,
      to compare the detected voltage to a reference voltage, and
      to output a detection signal based on the comparison; and
   a disabling circuit to control a connection between the regulator and the interface based on the detection signal, wherein
   the first voltage at the input rail increases if a second voltage at a first terminal of the peripheral device exceeds a third voltage at a second terminal of the interface that connects to the first terminal.

6. The protection device of claim 5, further comprising:
   an alert unit to output an alert signal to indicate a malfunction with the peripheral device based on the detection signal.

7. The protection device of claim 5, wherein
   the computing device and the peripheral device are powered by separate power sources,
   the peripheral device connects to the interface via a Universal Serial Bus (USB), and
   the first terminal is to receive power and the second terminal is to transmit power.

8. The protection device of claim 5, wherein the disabling circuit includes a fuse and a transistor, where terminals of the transistor connect the regulator to the interface and a gate of the transistor connects to the detection signal.

9. The protection device of claim 5, wherein the disabling circuit includes a switch to toggle between an open and closed stated based on the detection signal.

10. The protection device of claim 5, wherein the detection circuit includes a comparator to compare the reference voltage to a divider voltage proportional to the first voltage at the input rail.

11. The protection device of claim 5, wherein the peripheral device transmits a current to the interface if the second voltage at the first terminal of the peripheral device is greater than the third voltage at the second terminal of the interface by a threshold voltage.

12. The protection device of claim 11, wherein the current flows to the input rail to be charged if the current from the peripheral device exceeds the current output by the regulator.

13. A power system, comprising:
   a regulator to receive a first voltage at a first rail and to output a second voltage at a second rail;
   a detection circuit to monitor a voltage level at the first rail of the regulator;
   an interface to connect to a peripheral device; and
   a disabling circuit to control a connection between the regulator and the interface based on an output of the detection circuit, wherein
   the voltage level at the first rail increases if a voltage level of the peripheral device is greater than a voltage level of the interface along a connection between the interface and the peripheral device.

14. The system of claim 13, wherein,
   the interface interfaces with the peripheral device via a Universal Serial Bus (USB) connection, and
   the interface receives a current from the peripheral device via a power pin of the USB connection.

* * * * *

UNITED STATES PATENT AND TRADEMARK OFFICE
CERTIFICATE OF CORRECTION

| | | |
|---|---|---|
| PATENT NO. | : 8,806,255 B2 | Page 1 of 1 |
| APPLICATION NO. | : 13/222736 | |
| DATED | : August 12, 2014 | |
| INVENTOR(S) | : Robert C Brooks et al. | |

It is certified that error appears in the above-identified patent and that said Letters Patent is hereby corrected as shown below:

In the Claims

In column 8, line 23, in Claim 9, delete "dosed" and insert -- closed --, therefor.

Signed and Sealed this
Twenty-fifth Day of November, 2014

Michelle K. Lee
*Deputy Director of the United States Patent and Trademark Office*